(12) United States Patent
Aoki et al.

(10) Patent No.: US 10,013,469 B2
(45) Date of Patent: Jul. 3, 2018

(54) VISUALIZATION DEVICE, VISUALIZATION METHOD AND VISUALIZATION PROGRAM

(71) Applicant: NEC Corporation, Minato-ku, Tokyo (JP)

(72) Inventors: Kenji Aoki, Tokyo (JP); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 14/652,153

(22) PCT Filed: Dec. 3, 2013

(86) PCT No.: PCT/JP2013/007078
§ 371 (c)(1),
(2) Date: Jun. 15, 2015

(87) PCT Pub. No.: WO2014/091712
PCT Pub. Date: Jun. 19, 2014

(65) Prior Publication Data
US 2015/0339364 A1    Nov. 26, 2015

(30) Foreign Application Priority Data
Dec. 13, 2012 (JP) ................................ 2012-272413

(51) Int. Cl.
*G06F 17/30* (2006.01)
*G06Q 30/00* (2012.01)

(52) U.S. Cl.
CPC .. *G06F 17/30572* (2013.01); *G06F 17/30598* (2013.01); *G06Q 30/01* (2013.01)

(58) Field of Classification Search
None
See application file for complete search history.

(56) References Cited

U.S. PATENT DOCUMENTS 6,750,864 B1 * 6/2004 Anwar ............. G06F 17/30489
345/440
7,812,838 B1 * 10/2010 Ian .......................... G06F 3/023
345/419

(Continued)

FOREIGN PATENT DOCUMENTS

JP    2004-157814 A    6/2004
JP    2008-299363 A    12/2008

OTHER PUBLICATIONS

Pent et al, "Clutter Reduction in Multi-Dimensional Data Visualization Using Dimension Reordering", 2004.*

(Continued)

*Primary Examiner* — Hung Le

(57) ABSTRACT

A visualization device includes: an evaluation index calculation unit 11 which calculates the value of an evaluation index representing a feature degree for each of combinations of a first attribute group and a second attribute group in terms of data on the second attribute group including one or more attributes and conditioned with the first attribute group including one or more attributes among high-dimensional data to be visualized; and a visualization processing unit 12 which generates image information for presenting combinations of the first attribute group and the second attribute group, which are determined to have large evaluation index values based on a predetermined criterion.

10 Claims, 6 Drawing Sheets

(56) References Cited

U.S. PATENT DOCUMENTS

| | | | | |
|---|---|---|---|---|
| 8,615,511 B2* | 12/2013 | Jones | ............... | G06F 17/30572 707/713 |
| 8,745,086 B2* | 6/2014 | Cardno | ............. | G06Q 30/0201 707/775 |
| 2001/0047355 A1 | 11/2001 | Anwar | | |
| 2002/0053986 A1* | 5/2002 | Brooks | ............... | H03M 3/496 341/143 |
| 2002/0126121 A1* | 9/2002 | Robbins | ............... | G06T 11/206 345/440 |
| 2004/0196287 A1* | 10/2004 | Wong | ..................... | H04L 41/22 345/440 |
| 2007/0005582 A1 | 1/2007 | Navratil et al. | | |
| 2008/0071843 A1* | 3/2008 | Papadimitriou | .. | G06F 17/30592 |
| 2008/0111826 A1* | 5/2008 | Endrikhovski | ... | G06F 17/30994 345/582 |
| 2009/0013281 A1* | 1/2009 | Helfman | .......... | G06F 17/30572 715/788 |
| 2009/0217147 A1* | 8/2009 | Thomsen | ......... | G06F 17/30536 715/214 |
| 2009/0322754 A1* | 12/2009 | Robertson | ............. | G06T 11/20 345/440 |
| 2010/0194778 A1* | 8/2010 | Robertson | ............ | G06T 11/206 345/619 |
| 2011/0029926 A1* | 2/2011 | Hao | ................. | G06F 17/30722 715/835 |
| 2012/0013611 A1* | 1/2012 | Brath | .................... | G06T 11/206 345/419 |
| 2012/0013619 A1* | 1/2012 | Brath | .................... | G06T 11/206 345/441 |
| 2012/0191704 A1* | 7/2012 | Jones | ................ | G06F 17/30572 707/722 |
| 2012/0278321 A1* | 11/2012 | Traub | ................ | G06F 17/30657 707/736 |
| 2012/0311496 A1* | 12/2012 | Cao | ................... | G06F 17/30601 715/821 |
| 2012/0331404 A1* | 12/2012 | Buford | ................... | G06Q 10/10 715/757 |
| 2013/0215137 A1* | 8/2013 | Hao | ................... | G06Q 10/1093 345/593 |

OTHER PUBLICATIONS

International Search Report for PCT Application No. PCT/JP2013/007078, dated Mar. 11, 2014.

Unju Tei et al., "A high-dimensional data visualization techinique using a set of low-dimensional plot (1)", 2012 Nendo Annual Conference of JSAI (Dai 26 Kai) Ronbunshu [CD-ROM] 2012 Nendo Annual Conference of JSAI (Dai 26 kai) Ronbunshu, Jun. 12, 2012 (Jun. 12, 2012), pp. 1 to 4. Cited in the ISR as "Teijigen Plot no Shugo ni yoru Kojigen Data Kashika no Ichi Shuho (1)". English Abstract.

Yuichi Iizuka et al., "A Study on Data Visualization Based on Category and Characteristics", IPSJ SIG Notes, Jan. 23, 1999 (Jan. 23, 1999), vol. 99, No. 6, pp. 7 to 12. Cited in the ISR. English Abstract.

Hiroshi Ishikawa, chapter 13 Kashika, Data Mining to Shugochi-Kiso kara Web, Social Media made-, 1st edition, Kyoritsu Shuppan Co., Ltd., Mitsuaki Nanjo, Jul. 15, 2012 (Jul. 15, 2012), pp. 199 to 211. Cited in the ISR.

Japanese Office Action for JP Application No. 2014-551875 dated Oct. 10, 2017 with English Translation.

\* cited by examiner

VISUALIZATION DEVICE, VISUALIZATION METHOD AND VISUALIZATION PROGRAM

This application is a National Stage Entry of PCT/JP2013/007078 filed on Dec. 3, 2013, which claims priority from Japanese Patent Application 2012-272413 filed on Dec. 13, 2012, the contents of all of which are incorporated herein by reference, in their entirety.

TECHNICAL FIELD

The present invention relates to a visualization device, a visualization method, and a visualization program, which make a data structure, especially an overview of data distribution, graspable to examine preprocessing and an analytical method to be applied in performing data analysis on high-dimensional data.

BACKGROUND ART

A data visualization technique is a technique essential for advancing work efficiently in data analysis work. With the development of sensing technology and information management technology, the necessity has increased in recent years where data have become enormous and complicated.

The following scenes are considered as typical scenes of application of the data visualization technique in the area of data analysis: (1) A scene where a data structure is overviewed as a stage prior to analysis, (2) a scene where learning results are interpreted when the data structure is learned as a model by a machine learning technique or the like, and (3) a scene where prediction results are considered when a prediction is made using the learned model.

In the scene (1), there is a method as typical visualization means used to overview the data structure, where after high-dimensional data are compressed into lower dimensions using a multivariate analysis technique such as principal component analysis or multidimensional scaling, the compressed data are displayed on a two-dimensional scatter plots. There is also a visualization technique, called Scatter Plot Matrix (hereinafter referred to as SPM), for arranging, in a matrix form, two-dimensional scatter plots for all combinations of two-dimensional data obtained from the original high-dimensional data. Further, there is a visualization technique, called Parallel Coordinate Plot (hereinafter referred to as PCP or parallel coordinate plot), for arranging axes corresponding to respective dimensions longitudinally in parallel with one another, plotting observed values so that the minimum value will appear at the lower end and the maximum value will appear at the upper end in all the dimensions, and connecting observed values on adjacent axes with line segments.

The principal component analysis and the multidimensional scaling are useful to visualize information indicative of scattering of data points in a multidimensional space while storing the information as much as possible. Further, the SPM and the PCP are useful to visualize a relationship between specific minor dimensions existing in high dimensional space by one diagram as a whole.

Patent Literature (PTL) 1 describes a method of classifying learning data with continuous-valued attributes using a decision tree based on the data distribution feature to make a decision of or change in a model structure easy. In the method described in PTL 1, each node in a generated decision tree is displayed as a scatter plot of an objective function as a data group concerning certain one attribute and an explanatory function as a data group concerning the multiple remaining attributes to make the data distribution feature understandable.

CITATION LIST

Patent Literature

PTL 1: Japanese Patent Application Laid-Open No. 2004-157814

SUMMARY OF INVENTION

Technical Problem

In the principal component analysis, for example, there is a problem that it is difficult to interpret a visualized content depending on the data even in a relatively low dimension. Further, in the multidimensional scaling, for example, there is a problem that the plot itself becomes complicated as the number of data and the number of dimensions increase. Thus, these visualization techniques are not necessarily versatile.

Further, in the method described in PTL 1, attributes displayed as scatter plots are fixed to objective variables and certain one explanatory variable. Therefore, an attribute to be displayed cannot be set for each node. As a result, for example, when data structures existing in high-dimensional data are to be analyzed, the data structures capable of being overviewed by a user (analyst) are limited to some of the data structures.

Therefore, it is an object of the present invention to provide a visualization device, a visualization method, and a visualization program, capable of overviewing more data structures as characteristic data structures existing in high-dimensional data to be analyzed when a user analyzes the high-dimensional data.

Solution to Problem

A visualization device according to the present invention includes: an evaluation index calculation unit which calculates the value of an evaluation index representing a feature degree for each of combinations of a first attribute group and a second attribute group in terms of data on the second attribute group including one or more attributes and conditioned with the first attribute group including one or more attributes among high-dimensional data to be visualized; and a visualization processing unit which generates image information for presenting combinations of the first attribute group and the second attribute group, which are determined to have large evaluation index values based on a predetermined criterion.

Specifically, the visualization device according to the present invention narrows down data having characteristic structures in the high-dimensional data before performing visualization processing. Here, it is assumed that data are given in a matrix form of [sample×attribute]. Hereinafter, the attribute is synonymous with the dimension. Next, the visualization device applies visualization processing itself to the data narrowed down. As the method of narrowing down data having characteristic structures, consider paying attention to data on some attributes (second attribute group) conditioned with other some attributes (first attribute group). Here, the presence of multiple combinations of the first attribute group and the second attribute group is assumed. Therefore, it is desired to be able to extract as many combinations as possible from the standpoint of visualization to enable the analyst to overview as many data structures as possible. As the method of enabling the analyst to overview as many data structures as possible, for example, there is a method of defining some sort of evaluation index representing the feature degree of a data structure, calculating a value of the evaluation index for each combination of the first attribute group and the second attribute group, and applying an appropriate visualization technique to a combination of the first attribute group and the second attribute group having a particularly large value. Here, as the evaluation index, for example, a correlation coefficient or a quantity such as degree-of-separation/mutual information when class information is given is considered. The class information is an attribute representing a quantity to be predicted in data analysis. For example, for marketing in CRM (Customer Relationship Management), an attribute representing the purchase behavior of customers corresponds to the class information. Specifically, the degree of separation is the accuracy rate of class classification. When multiple combinations of attribute groups large in evaluation index exist, the visualization device provides an interface to enable the analyst to overview all the combinations as much as possible at a time. As an example of the method for enabling overviewing of all the combinations of attribute groups at a time, there is a method of arranging graphs in a tree view format to be described later.

A visualization method according to the present invention includes: calculating the value of an evaluation index representing a feature degree for each of combinations of a first attribute group and a second attribute group in terms of data on the second attribute group including one or more attributes and conditioned with the first attribute group including one or more attributes among high-dimensional data to be visualized; and generating image information for presenting combinations of the first attribute group and the second attribute group, which are determined to have large evaluation index values based on a predetermined criterion.

A visualization program according to the present invention causes a computer to execute: a process of calculating the value of an evaluation index representing a feature degree for each of combinations of a first attribute group and a second attribute group in terms of data on the second attribute group including one or more attributes and conditioned with the first attribute group including one or more attributes among high-dimensional data to be visualized; and a process of generating image information for presenting combinations of the first attribute group and the second attribute group, which are determined to have large evaluation index values based on a predetermined criterion.

Advantageous Effect of Invention

According to the present invention, when analyzing high-dimensional data, a user can overview more data structures as characteristic data structures existing in high-dimensional data to be analyzed.

DESCRIPTION OF EMBODIMENTS

Exemplary Embodiment 1

A first exemplary embodiment of the present invention will be described below with reference to the accompanying drawings.

Figure 1:
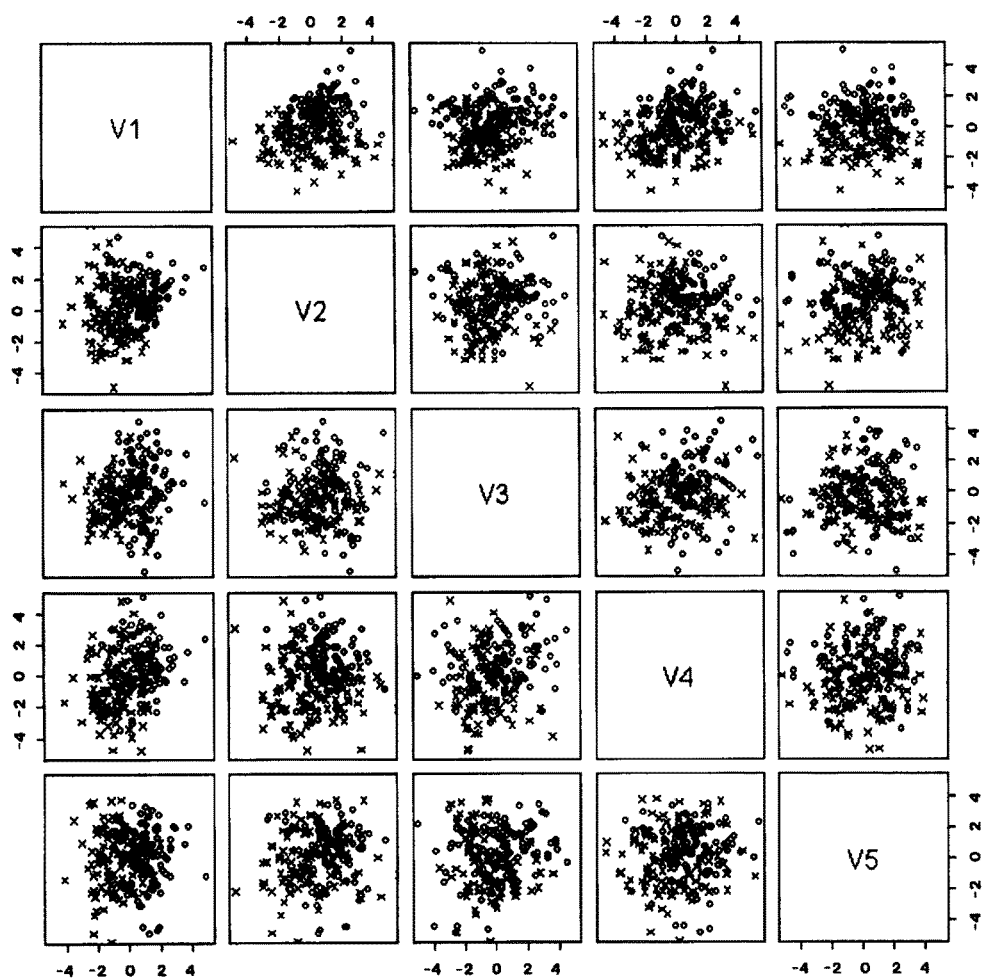
FIG. 1 It depicts an explanatory diagram depicting an example of the results of visualizing five-dimensional data using SPM.

FIG. 1 is an explanatory diagram depicting an example of the results of visualizing five-dimensional data using SPM. Here, a problem of classifying "o" indicative of one sample and "x" indicative of the other sample for the five-dimensional data using SPM depicted in FIG. 1 is considered. When class information is purchase behavior, the sample represents each individual customer. In FIG. 1, scatter plots for any two-dimensional combinations in five dimensions are depicted.

An analyst can overview a distribution of data in any two-dimensional space through the scatter plots depicted in FIG. 1. For example, the analyst can read from FIG. 1 that "o" is concentratedly distributed as relatively large values and "x" is concentratedly distributed as relatively small values in a first dimension (attribute V1). However, it is difficult to read, form the scatter plots depicted in FIG. 1, further information regarding classification information on "o" and "x" at a time.

In the exemplary embodiment, a decision tree is used as a method of narrowing down data. Further, since the classification problem is considered here, a degree of separation between "o" and "x" as an index representing a feature degree is considered.

Figure 2:
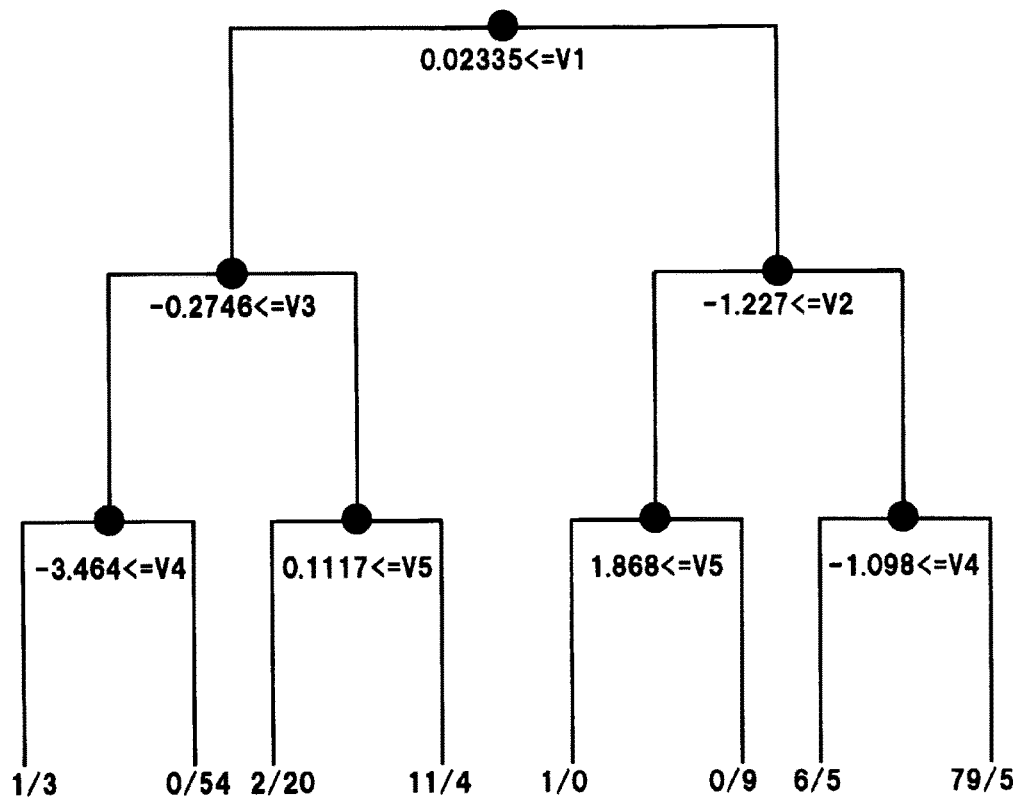
FIG. 2 It depicts an explanatory diagram depicting an example of a decision tree created based on the five-dimensional data depicted in FIG. 1.

FIG. 2 is an explanatory diagram depicting an example of the decision tree created based on the five-dimensional data depicted in FIG. 1. The inequalities in the decision tree depicted in FIG. 2 represent branch conditions, and the numbers of leaves represent "the number of o pieces" or "the number of x pieces."

In the exemplary embodiment, a visualization device extracts a dimension in which "o" and "x" are separated best as a node closest to the root of the tree, i.e., as a node closest to the upper part of FIG. 2 in creating the decision tree. Therefore, for example, it can be read from the decision tree depicted in FIG. 2 that the attribute V1 best separates "o" and "x" like the scatter plots depicted in FIG. 1. It can also be read that attribute V2 best separates "o" and "x" in terms of data with values of attribute V1 being 0.02335 or more. Further, it can be read that attribute V3 best separates "o" and "x" in terms of data with values of attribute V1 being less than 0.02335.

Figure 3:
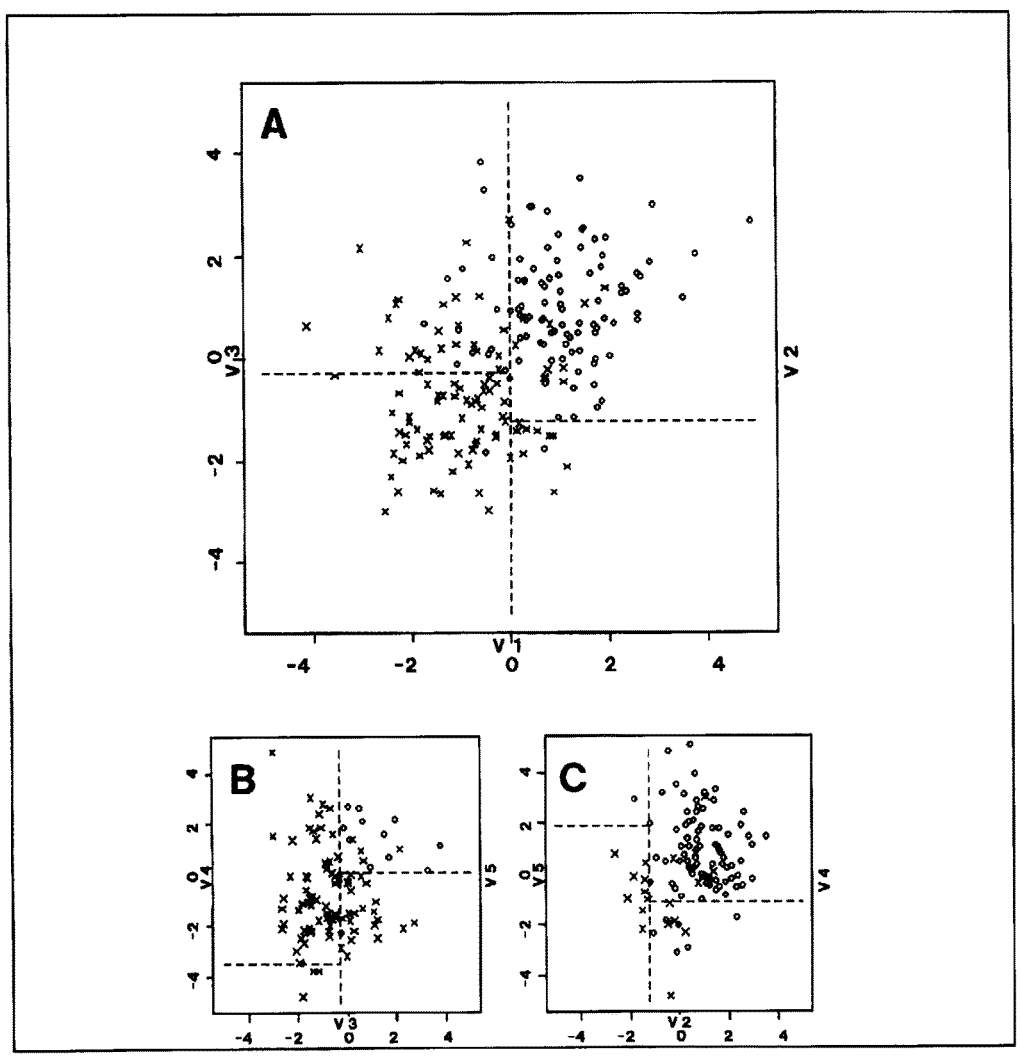
FIG. 3 It depicts an explanatory diagram depicting an example of the output results of a visualization device for the five-dimensional data depicted in FIG. 1.

Further, in the exemplary embodiment, the visualization device provides an interface as depicted in FIG. 3 as output results to enable these pieces of information on the classification between "o" and "x" to be overviewed at a time. FIG. 3 is an explanatory diagram depicting an example of the output results of the visualization device for the five-dimensional data depicted in FIG. 1. In FIG. 3, three scatter plots are arranged to correspond to the structure of the decision tree depicted in FIG. 2. Each dashed line in each scatter plot depicted in FIG. 3 is drawn in a position corresponding to the left side value of the inequality at each node depicted in FIG. 2.

Scatter plot A depicted in FIG. 3 corresponds to a node with the branch condition being "0.02335<=V1," a node with "−1.227<=V2," and a node with "−0.2746<=V3" depicted in FIG. 2.

Scatter plot B depicted in FIG. 3 corresponds to a node with the branch condition being "−0.2746<=V3," a node with "0.1117<=V5," and a node with "−3.464<=V4" depicted in FIG. 2. In other words, scatter plot B represents data regarding attribute V3, attribute V5, and attribute V4, limited to samples small in the values of attribute V1, i.e., conditioned by attribute V1. In the case of scatter plot B, attribute V1 corresponds to a first attribute group, and attribute V3, attribute V5, and attribute V4 correspond to a second attribute group.

Scatter plot C depicted in FIG. 3 corresponds to a node with the branch condition being "−1.227<=V2," a node with "−1.098<=V4," and a node with "1.868<=V5" depicted in FIG. 2. In other words, scatter plot C represents data regarding attribute V2, attribute V4, and attribute V5, limited to samples large in the values of attribute V1, i.e., conditioned by attribute V1. In the case of scatter plot C, attribute V1 corresponds to the first attribute group, and attribute V2, attribute V4, and attribute V5 correspond to the second attribute group.

Although three scatter plots are contained in FIG. 3, any number of scatter plots may be contained in the output results. For example, the number of scatter plots may be changed according to the depth of the tree, or only scatter plots corresponding to nodes separating "o" and "x" well, i.e., nodes having particularly large evaluation index values may be contained in the output results. Note that the determination as to whether a node separates "o" and "x" well may be made, for example, by determining whether the evaluation index value is larger than a predetermined criterion.

From scatter plot A depicted in FIG. 3, when data are narrowed down to samples taking on large values in terms of attribute V1, the analyst can read that "o" is distributed as relatively large values and "x" is distributed as relatively small values in terms of attribute V2 disproportionately. On the other hand, when data are narrowed down to samples taking on small values in terms of attribute V1, the analyst can read that "o" is distributed as relatively large values and "x" is distributed as relatively small values in terms of attribute V3 disproportionately.

Similarly, from scatter plot B, when data are narrowed down to samples taking on small values in terms of attribute V1 and further large values in terms of attribute V3, the analyst can read that "o" and "x" are relatively separated in terms of attribute V5.

Similarly, from scatter plot C, when data are narrowed down to samples taking on large values in terms of attribute V1 and further large values in terms of attribute V2, the analyst can read that "x" is concentratedly distributed as small values in terms of attribute V4 compared with "o."

Information on the above data structure that can be read from each scatter plot depicted in FIG. 3 cannot be found by the typical visualization means mentioned above. Further, the results depicted in FIG. 3 can be combined with the background knowledge of the analyst regarding data to enable the analyst to develop an analysis policy, such as to exclude some data from the analysis or apply another analytical method to some data.

Figure 4:
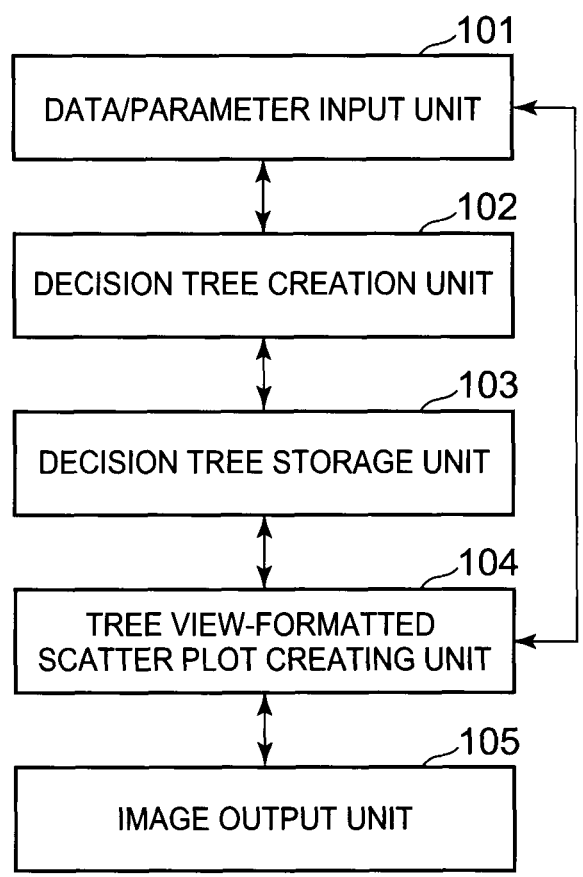
FIG. 4 It depicts a block diagram depicting the configuration of a first exemplary embodiment of a visualization device according to the present invention.

FIG. 4 is a block diagram depicting the configuration of the first exemplary embodiment of the visualization device according to the present invention.

As depicted in FIG. 4, the visualization device includes a data/parameter input unit 101, a decision tree creation unit 102, a decision tree storage unit 103, a tree view-formatted scatter plot creating unit 104, and an image output unit 105.

The data/parameter input unit 101 takes input of high-dimensional data to be visualized, decision tree parameters, and scatter plot parameters from the outside of the device. The decision tree parameters are parameters necessary to create a decision tree. The scatter plot parameters are parameters necessary to output an image. As the decision tree parameters, for example, the data/parameter input unit 101 takes input of an index for evaluating a good division, an algorithm for creating the decision tree, the minimum size of data on the depth of the tree or belonging to leaves, and the like. The data/parameter input unit 101 outputs the input data and parameters to the decision tree creation unit 102 and the tree view-formatted scatter plot creating unit 104.

The decision tree creation unit 102 takes input of data to be visualized and the decision tree parameters from the data/parameter input unit 101. The decision tree creation unit 102 creates the decision tree for the input data as depicted in FIG. 2 according to information on the input decision tree parameters. The numerical values such as "0.02335," "−1.227," and the like in the inequalities depicted in FIG. 2 are an example of numerical values calculated by the decision tree creation unit 102. The decision tree creation unit 102 outputs information on the created decision tree to the decision tree storage unit 103.

The decision tree storage unit 103 stores the information on the decision tree input from the decision tree creation unit 102.

The tree view-formatted scatter plot creating unit 104 takes input of data to be visualized and the scatter plot parameters from the data/parameter input unit 101. The tree view-formatted scatter plot creating unit 104 further acquires the information on the decision tree from the decision tree storage unit 103. Based on the scatter plot parameters and the information on the decision tree, the tree view-formatted scatter plot creating unit 104 creates scatter plots on data to be visualized as depicted in FIG. 1 and arranged in a tree view format as depicted in FIG. 3. The tree view-formatted scatter plot creating unit 104 outputs image information including the created scatter plots to the image output unit 105. Here, for example, the scatter plot parameters are parameters that specify the colors or shapes of samples, the presence or absence of the label or scale of each axis, the presence or absence of the indications of dashed lines, and the like in the scatter plots depicted in FIG. 3.

The image output unit 105 is, for example, a display device or a printer. The image output unit 105 outputs the image information including the tree view-formatted scatter plots input from the tree view-formatted scatter plot creating unit 104.

The data/parameter input unit 101, the decision tree creation unit 102, and the tree view-formatted scatter plot creating unit 104 are, for example, implemented by a computer operating according to a visualization program. In this case, a CPU has only to read the visualization program and operate as the data/parameter input unit 101, the decision tree creation unit 102, and the tree view-formatted scatter plot creating unit 104 according to the program. Each of the data/parameter input unit 101, the decision tree creation unit 102, and the tree view-formatted scatter plot creating unit 104 may also be realized by separate hardware.

The decision tree storage unit 103 is realized by a storage device such as a memory provided in the visualization device.

Next, the operation of the exemplary embodiment will be described.

Figure 5:
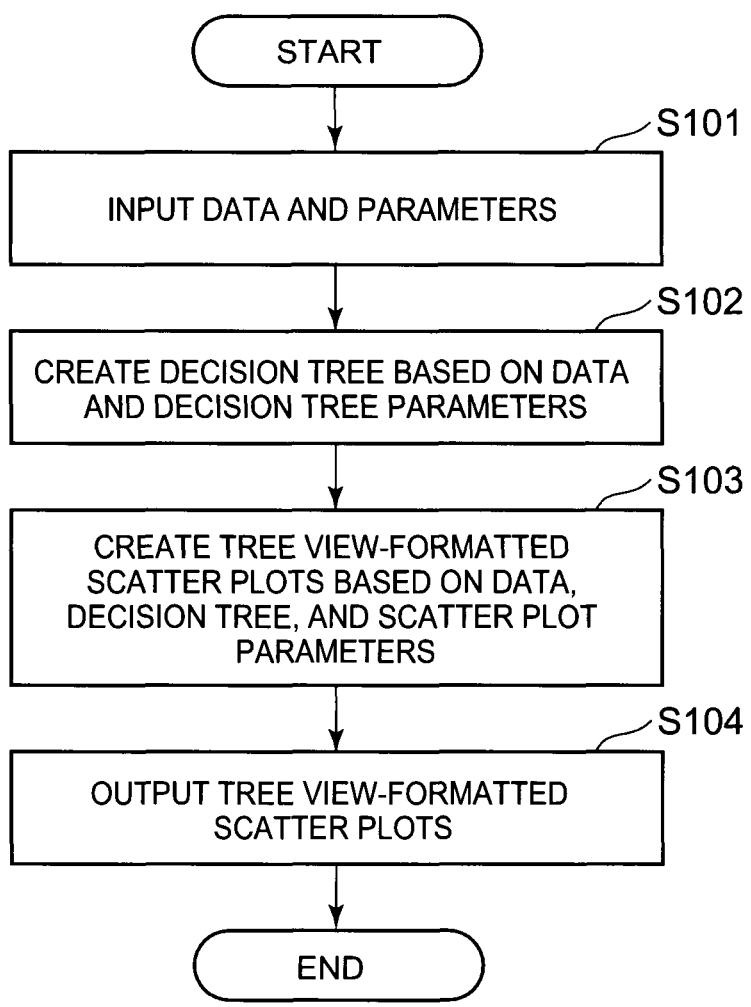
FIG. 5 It depicts a flowchart depicting the operation of the first exemplary embodiment of the visualization device according to the present invention.

FIG. 5 is a flowchart depicting the operation of the first exemplary embodiment of the visualization device according to the present invention.

The data/parameter input unit 101 takes input of high-dimensional data to be visualized, decision tree parameters, and scatter plot parameters (step S101). For example, the data and the parameters are entered by the analyst into the data/parameter input unit 101. The data/parameter input unit 101 outputs the high-dimensional data to be visualized and the decision tree parameters to the decision tree creation unit 102. The data/parameter input unit 101 outputs the high-dimensional data to be visualized and the scatter plot parameters to the tree view-formatted scatter plot creating unit 104.

Next, the decision tree creation unit 102 creates a decision tree according to the data to be visualized and information on the decision tree parameters input from the data/parameter input unit 101, and stores information on the created decision tree in the decision tree storage unit 103 (step S102).

Based on the data to be visualized and the scatter plot parameters input from the data/parameter input unit 101, and the information on the decision tree stored in the decision tree storage unit 103, the tree view-formatted scatter plot creating unit 104 creates scatter plots as depicted in FIG. 3, i.e., scatter plots arranged in a tree view format (step S103). The tree view-formatted scatter plot creating unit 104 outputs image information including the created scatter plots to the image output unit 105.

The image output unit 105 outputs the image information including the tree view-formatted scatter plots (step S104).

As described above, in the exemplary embodiment, data having characteristic structures in the high-dimensional data are narrowed down before the visualization processing itself is performed. Further, in the exemplary embodiment, the tree view-formatted scatter plots created based on the information on the decision tree used to narrow down the data are output so that more characteristic data structures existing in the high-dimensional data can be overviewed at a time. Therefore, when analyzing the high-dimensional data, the analyst can grasp multiple characteristic data structures existing in the data. This enables the analyst to develop a policy as to what preprocessing and analytical method are to be applied.

Further, since the exemplary embodiment focuses on the extraction of conditioned data structures, samples having characteristic data structures can be extracted beforehand as preprocessing in analyzing the high-dimensional data and analyzed separately. In addition, it is possible to provide information used to decide on the number of mixtures and a model in each component when a multipeak model like a contaminated normal distribution as analysis means is applied to data.

In the exemplary embodiment, the case where the visualization device includes the image output unit is described, but the image output unit may not be included in the visualization device. In this case, the tree view-formatted scatter plot creating unit 104 has only to output image information to an external display, printer, or the like communicable with the visualization device. According to such a configuration, the configuration of the visualization device can be more simplified.

Further, in the exemplary embodiment, the case where the degree of separation is used as the evaluation index representing the feature degree is described, but a correlation coefficient may be used. Further, when class information on the data to be visualized is given, entropy may be used as the evaluation index representing the feature degree.

Further, in the exemplary embodiment, the case where the scatter plots are arranged in a tree view format and displayed is described, but the PCP may be arranged in a tree view format and displayed. Further, in the exemplary embodiment, the case where the decision tree creation unit 102 uses a binary tree to create the decision tree is described, but the decision tree creation unit 102 may use a multi-branch tree other than the binary tree to create the decision tree. In this case, the tree view-formatted scatter plot creating unit 104 has only to create tree view-formatted scatter plots according to the structure of the decision tree.

The present invention is applicable to general scenes for discovery of knowledge from high-dimensional data. For example, when a reason for the failure of an industrial product such as a car or a home electrical appliance is identified using machine learning technology from information on the values of many sensors incorporated in the industrial product, the visualization device according to the present invention can be used. In this case, it can be preliminarily overviewed whether there is a characteristic structure between data on the kind of specific reason for a failure and data on the kind of sensor at the stage of examining the analytical method. As another example, when a relationship between personal information on customers and purchase behavior is examined for marketing in CRM, the visualization device according to the present invention can also be used in the same way.

Figure 6:
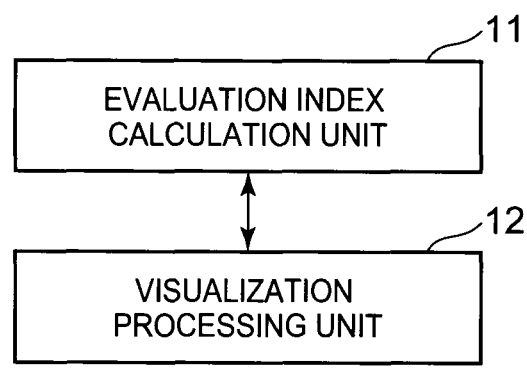
FIG. 6 It depicts a block diagram depicting a minimum configuration of a visualization device according to the present invention.

FIG. 6 is a block diagram depicting a minimum configuration of a visualization device according to the present invention. As depicted in FIG. 6, the visualization device includes: an evaluation index calculation unit 11 (corresponding to the decision tree creation unit 102 depicted in FIG. 4) which calculates the value of an evaluation index representing a feature degree for each of combinations of a first attribute group and a second attribute group in terms of data on the second attribute group including one or more attributes and conditioned with the first attribute group including one or more attributes among high-dimensional data to be visualized; and a visualization processing unit 12 (corresponding to the tree view-formatted scatter plot creating unit 104 depicted in FIG. 4) which generates image information for presenting combinations of the first attribute group and the second attribute group, which are determined to have large evaluation index values based on a predetermined criterion.

According to this configuration, information on combinations of attribute groups having particularly large evaluation index values can be presented to a user. Therefore, when high-dimensional data are to be analyzed, the analyst can grasp multiple characteristic data structures existing in the data. This enables the analyst to develop a policy as to what preprocessing and analytical method are to be applied.

The following visualization devices are also disclosed in the aforementioned exemplary embodiment.

(1) A visualization device wherein the evaluation index calculation unit 11 uses a binary tree as the criterion for conditioning the second attribute group with the first attribute group.

According to this configuration, an interface including tree view-formatted scatter plots as depicted in FIG. 3 can be presented to the analyst.

(2) A visualization device wherein the evaluation index calculation unit 11 uses a multi-branch tree as the criterion for conditioning the second attribute group with the first attribute group.

According to this configuration, tree view-formatted scatter plots on high-dimensional data can be created based on information on a multi-branch tree created based on the high-dimensional data. This can deal with more complicated conditioning in creating a decision tree.

(3) A visualization device wherein the evaluation index calculation unit 11 uses a correlation coefficient as the evaluation index representing the feature degree.

(4) A visualization device wherein when class information on data to be visualized is given, the evaluation index calculation unit 11 uses an accuracy rate of class classification as the evaluation index representing the feature degree.

(5) A visualization device wherein when class information on data to be visualized is given, the evaluation index calculation unit 11 uses entropy as the evaluation index representing the feature degree.

According to such configurations, since the evaluation index representing the feature degree of a data structure can be expressed as a numerical value, a comparison of evaluation indexes for each of the combinations of the first attribute group and the second attribute group can be made more accurately.

(6) A visualization device wherein the visualization processing unit 12 outputs image information in which two-dimensional scatter plots corresponding to combinations of the first attribute group and the second attribute group, which are determined to have large evaluation index values, are arranged in a tree view format.

(7) A visualization device wherein the visualization processing unit 12 outputs image information in which parallel coordinate plots corresponding to combinations of the first attribute group and the second attribute group, which are determined to have large evaluation index values, are arranged in a tree view format.

According to such configurations, the analyst can overview more characteristic data structures existing in the high-dimensional data to be visualized at a time. Further, since a combination of attribute groups having a larger evaluation index value is displayed in a position closer to the upper part of the tree view, the analyst can readily interpret the visualized content. In addition, since only scatter plots corresponding to combinations of attribute groups having particularly large evaluation index values can be presented to the user, even when the number of data and number of dimensions of high-dimensional data to be visualized become large, the plots themselves do not become complicated.

While the present invention has been described with reference to the exemplary embodiment and examples, the present invention is not limited to the aforementioned exemplary embodiment and examples. Various changes that can be understood by those skilled in the art within the scope of the present invention can be made to the configurations and details of the present invention.

This application is based upon and claims the benefit of priority from Japanese patent application No. 2012-272413, filed on Dec. 13, 2012, the disclosure of which is incorporated herein in its entirety by reference.

REFERENCE SIGNS LIST 11 evaluation index calculation unit
12 visualization processing unit
101 data/parameter input unit
102 decision tree creation unit
103 decision tree storage unit
104 tree view-formatted scatter plot creating unit
105 image output unit

What is claimed is:

1. A visualization device comprising:
an evaluation index calculation unit which is implemented by a processor and which calculates a value of an evaluation index representing a feature degree for each of combinations of a first attribute group and a second attribute group in terms of data on the second attribute group including one or more attributes and conditioned with the first attribute group including one or more attributes among high-dimensional data to be visualized;
a visualization processing unit which is implemented by the processor and which generates image information for presenting combinations of the first attribute group and the second attribute group, which are determined to have large evaluation index values based on a predetermined criterion; and
an output device which depicts the high-dimensional data using the image information generated by the visualization processing unit.

2. The visualization device according to claim 1, wherein the evaluation index calculation unit uses a binary tree as the criterion for conditioning the second attribute group with the first attribute group.

3. The visualization device according to claim 1, wherein the evaluation index calculation unit uses a multi-branch tree as the criterion for conditioning the second attribute group with the first attribute group.

4. The visualization device according to claim 1, wherein the evaluation index calculation unit uses a correlation coefficient as the evaluation index representing the feature degree.

5. The visualization device according to claim 1, wherein when class information on data to be visualized is given, the evaluation index calculation unit uses an accuracy rate of class classification as the evaluation index representing the feature degree.

6. The visualization device according to claim 1, wherein when class information on data to be visualized is given, the evaluation index calculation unit uses entropy as the evaluation index representing the feature degree.

7. The visualization device according to claim 1, wherein the visualization processing unit outputs image information in which two-dimensional scatter plots corresponding to combinations of the first attribute group and the second attribute group, which are determined to have large evaluation index values, are arranged in a tree view format.

8. The visualization device according to claim 1, wherein the visualization processing unit outputs image information in which parallel coordinate plots corresponding to combinations of the first attribute group and the second attribute group, which are determined to have large evaluation index values, are arranged in a tree view format.

9. A visualization method comprising:
calculating a value of an evaluation index representing a feature degree for each of combinations of a first attribute group and a second attribute group in terms of data on the second attribute group including one or more attributes and conditioned with the first attribute group including one or more attributes among high-dimensional data to be visualized;

generating image information for presenting combinations of the first attribute group and the second attribute group, which are determined to have large evaluation index values based on a predetermined criterion; and depicting, by an output device, the high-dimensional data using the generated image information.

10. A non-transitory computer readable information recording medium storing a visualization program, when executed by a processor, that performs a method for calculating a value of an evaluation index representing a feature degree for each of combinations of a first attribute group and a second attribute group in terms of data on the second attribute group including one or more attributes and conditioned with the first attribute group including one or more attributes among high-dimensional data to be visualized;

generating image information for presenting combinations of the first attribute group and the second attribute group, which are determined to have large evaluation index values based on a predetermined criterion; and depicting, by an output device, the high-dimensional data using the image information.

* * * * *